No. 609,461. Patented Aug. 23, 1898.
J. E. PHILLIPS.
CREAM SEPARATOR.
(Application filed Sept. 11, 1897.)
(No Model.)
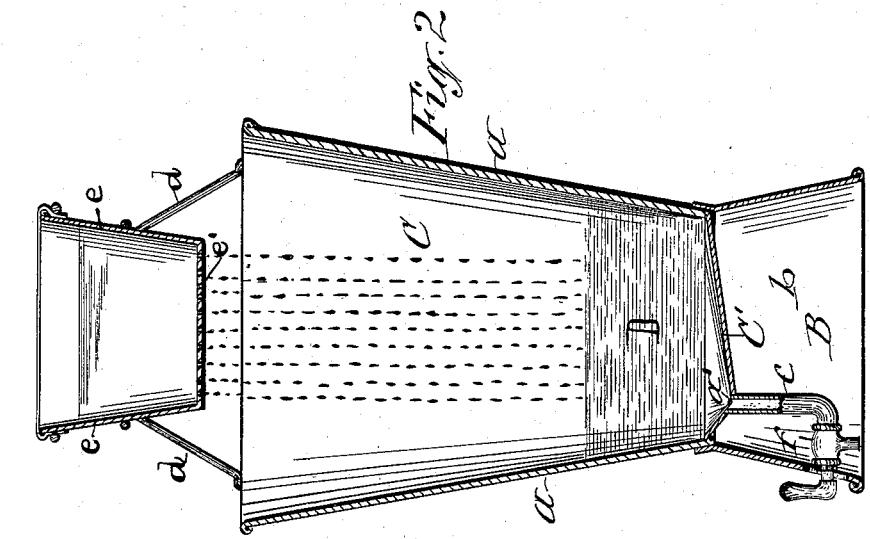
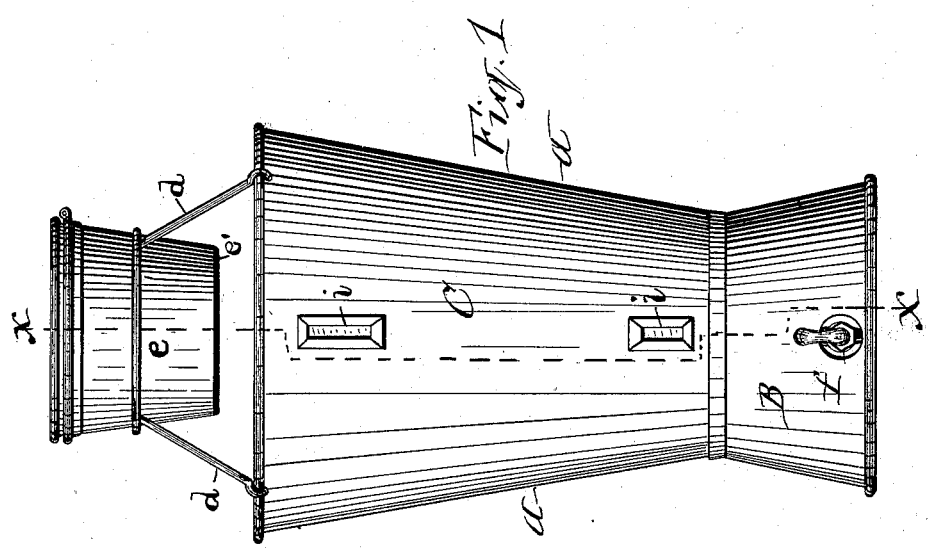
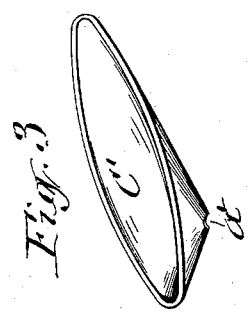
WITNESSES:
H. B. Smith
J. J. Laass
INVENTOR
John E. Phillips
By E. Laass
his ATTORNEY

UNITED STATES PATENT OFFICE.

JOHN E. PHILLIPS, OF CENTRAL SQUARE, NEW YORK.

CREAM-SEPARATOR.

SPECIFICATION forming part of Letters Patent No. 609,461, dated August 23, 1898.

Application filed September 11, 1897. Serial No. 651,285. (No model.)

*To all whom it may concern:*

Be it known that I, JOHN E. PHILLIPS, of Central Square, in the county of Oswego, in the State of New York, have invented new and useful Improvements in Cream-Separators, of which the following, taken in connection with the accompanying drawings, is a full, clear, and exact description.

This invention relates to the natural process of separating cream from milk by specific gravity, causing the cream to rise to the surface of the milk while maintained in a tranquil state.

By practical tests it has been found that the separation of the cream from the milk is promoted by dilution of the milk, and this has been usually done by pouring water into the milk at the time of setting the same to allow the cream to rise to the surface of the diluted milk.

The object of my present invention is to effect the separation of the cream from the milk more perfectly and expeditiously by dilution of the milk during the process of separating the cream therefrom; and to that end the invention consists in causing the milk containing the cream to fall in separate drops upon the surface of a tranquil body of water or suitable diluting liquid, and thereby diluting each drop separately and causing the cream thereof to be gathered on the surface of said liquid during the dilution of the drop.

In the annexed drawings, Figure 1 is a front view of an apparatus adapted for practicing my invention. Fig. 2 is a vertical transverse section on line X X in Fig. 1, and Fig. 3 is a detached perspective view of the bottom of the milk-can.

Similar letters of reference indicate corresponding parts.

C denotes the water receptacle or can, which I form with downwardly-converging walls $a\ a$, and thus gradually increase the diameter of the can from the bottom to the top thereof for the purpose hereinafter explained. The bottom $C'$ of said can I form with a conoidal depression, the deepest portion of which is in proximity to one side of the can and is provided with an outlet $a'$ thereat, as shown in Figs. 2 and 3 of the drawings. Said can is mounted on a base B, forming under the can a space $b$ to accommodate the pipe $c$, which extends laterally from the outlet $a'$ and is provided with a suitable faucet $f$ through which to draw the milk and water after the completion of the process of separating the cream therefrom. The can is formed of a sufficient height to provide a water-space D in the bottom of the can for the purpose hereinafter explained. Upon the top of the can is mounted a wire standard $d$ or other suitable device for supporting over the top of the can a milk-receptacle $e$, which is provided with a horizontal flat bottom $e'$, having small perforations, which are farther apart than the perforations of an ordinary strainer for the purpose of retarding the escape of the milk and causing it to descend in drops through the air to the top of the water, which has previously been introduced in the can preparatory to the treatment of the milk for separating the cream therefrom. The temperature of the water when first introduced into the can should be about 32° Fahrenheit. In said treatment the milk is to be poured into the receptacle $e$, from whence it escapes in drops, as aforesaid. Said drops falling upon the water in the can, each drop is diluted separately and the cream thereof is detained upon the top of the water, while the milk becomes commingled with the water. In this manner the process of separating the cream from the milk is very much expedited and the separation is rendered more positive and effectual. Said separation is further promoted by the gradually-increasing diameter of the can from the bottom upward, which gradually augments the cream-receiving surface of the separator, corresponding to the accumulation of diluted milk in the can and accumulation of cream rising to the top of said diluted milk. The continuously-enlarging surface of the diluted milk during the process of dropping milk into the water allows the cream to rise more freely and causes the cream to be collected in a thinner strata. After all the milk has thus passed from the receptacle $e$ into the can C the faucet $f$ is to be opened to allow the water, with the diluted milk, to escape through the pipe $c$.

The side of the can is provided with the usual transparent plates $i\ i$ through which to observe the process. The faucet $f$ is to be closed in time to retain the cream in the can, from whence it is subsequently drawn through the faucet.

What I claim as my invention is—

The within-described process of separating cream from milk by specific gravity, consisting in causing the creamy milk to fall in separate drops through the air onto the surface of a tranquil body of diluting liquid and thereby diluting each drop separately, and by the gentle diffusion of the milk of the successive drops in the diluting liquid causing the cream thereof to become separated from the diluted milk and form a stratum of cream upon the surface of the tranquil liquid, and subsequently drawing the diluted milk from under the supernatent stratum of cream as set forth.

In testimony whereof I have hereunto signed my name this 9th day of September, 1897.

JOHN E. PHILLIPS. [L. S.]

Witnesses:
J. J. LAASS,
H. B. SMITH.